(12) United States Patent
Hayashi

(10) Patent No.: US 6,500,248 B1
(45) Date of Patent: Dec. 31, 2002

(54) INK COMPOSITION FOR INK-JET RECORDING AND METHOD OF INK-JET RECORDING

(75) Inventor: Hiroko Hayashi, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/581,483

(22) PCT Filed: Oct. 15, 1999

(86) PCT No.: PCT/JP99/05711

§ 371 (c)(1),
(2), (4) Date: Jun. 14, 2000

(87) PCT Pub. No.: WO00/22056

PCT Pub. Date: Apr. 20, 2000

(30) Foreign Application Priority Data

Oct. 15, 1998 (JP) .......................................... 10-294170

(51) Int. Cl.$^7$ ............................................... C09D 11/02
(52) U.S. Cl. .............................. 106/31.86; 106/31.65; 106/31.89; 106/31.58; 106/31.59
(58) Field of Search .......................... 106/31.65, 31.86, 106/31.89, 31.58, 31.59

(56) References Cited

U.S. PATENT DOCUMENTS

| | | | |
|---|---|---|---|
| 5,183,502 A | 2/1993 | Meichsnër | 106/22 K |
| 5,196,056 A | 3/1993 | Prasad | 106/15.05 |
| 5,364,461 A | 11/1994 | Beach | 106/22 R |
| 5,623,294 A | 4/1997 | Takizawa | 347/98 |
| 5,746,818 A * | 5/1998 | Yatake | 106/31.86 |
| 5,990,227 A | 11/1999 | Takizawa | 524/517 |
| 6,004,389 A * | 12/1999 | Yatake | 106/31.86 |
| 6,051,057 A * | 4/2000 | Yatake et al. | 106/31.58 |
| 6,132,502 A * | 10/2000 | Yatake | 106/31.86 |
| 6,153,001 A * | 11/2000 | Suzuki et al. | 106/31.65 |

OTHER PUBLICATIONS

JPO Abstract 03(1991)–41171, Feb. 21, 1991.

* cited by examiner

Primary Examiner—Helene Klemanski
Assistant Examiner—Veronica F. Faison
(74) Attorney, Agent, or Firm—Ladas & Parry

(57) ABSTRACT

An ink composition for ink jet recording is provided which comprises at least a pigment, a 1,2-alkanediol, glycerin, a polyhydric alcohol derivative and/or an acetylene glycol surfactant, a water-soluble organic solvent, and water, the pigment having been surface treated to render the pigment dispersible and/or dissolvable in water without any dispersant, the 1,2-alkanediol being at least one member selected from the group consisting of 1,2-butanediol, 1,2-pentanediol, and 1,2-hexanediol, the ink composition having a surface tension of not more than 40 mNm$^{-1}$ at 20° C. This ink composition enables ink jet recording which can provide good print quality and can realize continuous printing.

25 Claims, 1 Drawing Sheet

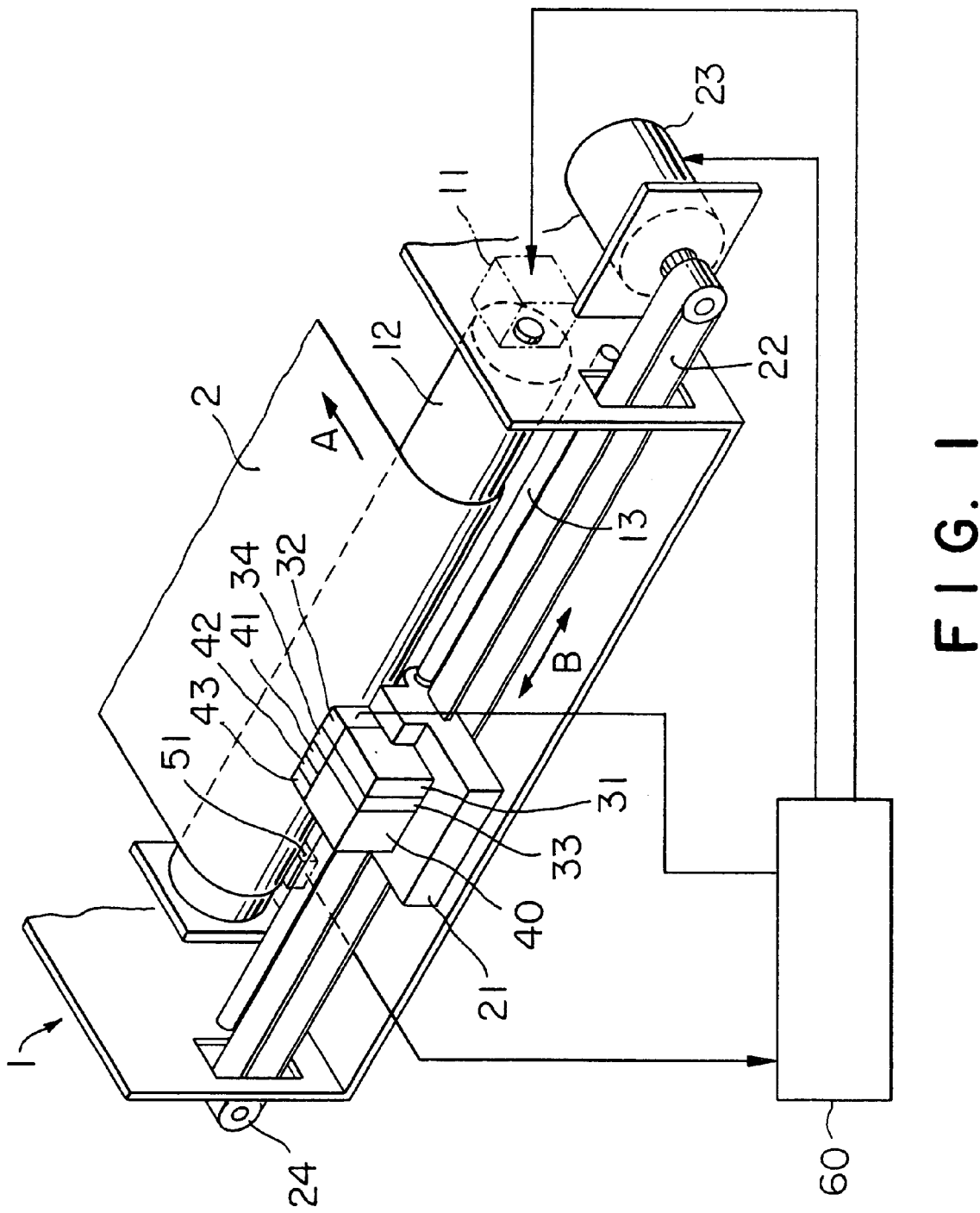
FIG. I

INK COMPOSITION FOR INK-JET RECORDING AND METHOD OF INK-JET RECORDING

BACKGROUND OF THE INVENTION

1. Field of the Invention

The present invention relates to an ink composition for ink jet recording which can offer high print quality and highly reliable images on plain papers, recycled papers, and specialty recording media for ink jet recording, and an ink jet recording method which can realize such images.

2. Background Art

Ink jet recording is a method wherein an ink is ejected as droplets through fine nozzles to record letters or figures onto the surface of recording media. Ink jet recording systems which have been developed and put to practical use include: a method wherein an electric signal is converted to a mechanical signal using an electrostrictive element to intermittently eject an ink reservoired in a nozzle head section, thereby recording letters or symbols on the surface of a recording medium; and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Various properties required of inks used in the above ink jet recording are such that the drying property of the print is good, no feathering is created in prints, uniform printing can be realized on the surface of all the recording media, and, in the case of multi-color printing, color-to-color intermixing does not occur. In particular, what is important for ink used in printing on paper as the recording medium is to effectively prevent feathering or bleeding attributable to a difference in wettability of the surface of paper by ink, especially bleeding at the boundary areas between contiguously printed black ink and color ink, and to improve the quality of printed images through an improvement in color development and fixation of a colorant on the recording medium. Among others, realization of good images has been desired for specialty recording media for ink jet recording which, in production thereof, have been optimized to be used in ink jet recording, as well as for plain papers which are inexpensive and easily available.

Various inks for ink jet recording, using a dye as a colorant have hitherto been proposed as inks which can yield good images on recording papers. For example, U.S. Pat. No. 5,183,502 proposes the addition of Surfynol 465 (manufactured by Air Products and Chemicals Inc., U.S.A.) as an acetylene glycol surfactant to dye-based inks, and U.S. Pat. No. 5,196,056 discloses the addition of both diethylene glycol mono-n-butyl ether and Surfynol 465 to dye-based inks.

Further, in order to realize images having good quality on plain papers, for example, Japanese Patent Laid-Open No. 41171/1991 proposes the use of a black ink, which is less likely to penetrate the recording medium, in combination with a color ink which is likely to penetrate the recording medium. Likewise, in order to realize images having good quality on plain papers, Japanese Patent Laid-Open No. 128514/1994 proposes a recording method wherein the deposition of a first liquid, containing a water-soluble resin having in its molecule at least one carboxyl group or anhydride thereof or sulfonic acid group, on a recording medium is followed by the deposition of a dye-containing ink on the recording medium in its liquid-deposited portion. Further, a variety of ink compositions using a pigment as a colorant have also been proposed. In most of these proposals, suppression of wetting of the surface of paper by ink by lowering the penetration of ink has been studied to improve the print quality, and this method has been put to practical use.

In many cases, however, conventional pigment-based inks have unsatisfactory penetration into paper. Therefore, even with the method wherein the wetting of the paper in its surface is suppressed, feathering or bleeding may be caused on plain papers, particularly on recycled papers. For this reason, a lot of time has been required for drying printed papers, and this has made it difficult to continuously perform printing. In particular, a recycled paper is an aggregate comprising components of various papers, and, hence, the components are different from each other or one another in ink penetration speed. This difference in ink penetration speed is likely to cause feathering or bleeding in prints.

Further, when pigment-based ink is printed, for example, on paper containing a conventional sizing agent, the pigment is often left on the surface of the paper or the like, leading to poor rubbing/scratch resistance of printed images, unless a certain level of ability to penetrate the recording media is imparted to this ink.

For the above reason, the development of a pigment-containing ink, which has excellent ability to penetrate recording media, can yield images having excellent rubbing/scratch resistance, can realize continuous and high-speed printing, and can provide prints having good image quality, has been desired in the art.

SUMMARY OF THE INVENTION

The present inventors have now found that an ink composition for ink jet recording can be provided which has an excellent ability to penetrate recording media, can realize continuous and high-speed printing, can offer high print density on plain papers and recycled papers, can realize high print quality free from feathering or bleeding, and has highly reliable printing performance. The present invention has been made based on such finding.

Accordingly, it is an object of the present invention to provide an ink composition for ink jet recording which has an excellent ability to penetrate recording media, can realize continuous and high-speed printing, and can produce prints having excellent quality.

Thus, according to one aspect of the present invention, there is provided an ink composition for ink jet recording, comprising at least a pigment, a 1,2-alkanediol, glycerin, a polyhydric alcohol derivative and/or an acetylene glycol surfactant, a water-soluble organic solvent, and water, said pigment having been surface treated to render the pigment dispersible and/or dissolvable in water without any dispersant, said 1,2-alkanediol being at least one member selected from the group consisting of 1,2-butanediol, 1,2-pentanediol, and 1,2-hexanediol, said ink composition having a surface tension of not more than 40 $mNm^{-1}$ at 20° C.

According to another aspect of the present invention, there is provided an ink jet recording method.

The ink jet recording method comprises the steps of: ejecting droplets of an ink composition; and depositing the droplets onto a recording medium to perform printing, wherein printing is performed using an ink composition containing a pigment as a colorant and an ink composition containing a dye as a colorant.

According to a further aspect of the present invention, there is provided an ink jet recording apparatus for practicing the above ink jet recording method.

The ink jet recording apparatus comprises:

recording medium-carrying means for holding and carrying a recording medium;

means for depositing, on the recording medium, an ink composition containing a pigment as a colorant and an ink composition containing a dye as a colorant to record an image; and ink jet recording means for controlling the means for depositing the ink compositions to record an image.

BRIEF DESCRIPTION OF THE DRAWING

FIG. 1 is a diagram showing an ink jet recording apparatus for practicing the ink jet recording method according to the present invention, which comprises a printer 1, specifically basically comprises: sheet-feeding means comprising a recording medium 2, a sheet feed motor 11, and a platen roller 12; and recording means comprising a recording head 34 for ejecting a dye-containing ink composition, a recording head 32 for ejecting a pigment-containing ink composition, and recording heads 41 to 43 respectively for ejecting yellow, magenta, and cyan inks.

DETAILED DESCRIPTION OF THE INVENTION

Ink composition

The ink composition according to the present invention can yield prints having good drying properties and free from feathering or bleeding, can be evenly printed on the surface of all the recording media, and can realize high print density, particularly higher black color density. Further, the ink composition according to the present invention, even when printed on plain papers, recycled papers, recording media for ink jet recording, and glossy recording media, has excellent colorant fixation.

The ink composition according to the present invention may be used in various recording methods using an ink composition. Recording methods using an ink composition include, for example, an ink jet recording method, a recording method using writing utensils, such as pens, and other various recording methods. Preferably, the ink composition according to the present invention is used in an ink jet recording method wherein droplets of an ink composition are ejected and deposited onto a recording medium to perform printing.

1, 2-Alkanediol

The ink composition according to the present invention preferably contains a 1,2-alkanediol. The 1,2-alkanediol has 4 to 6 carbon atoms, and preferred examples thereof include 1,2-butanediol, 1,2-pentanediol, and 1,2-hexanediol. According to the present invention, preferably, one of these alkanediols is solely used, or alternatively a combination of two or more of them is used. The addition of a 1,2-alkanediol having 4 to 6 carbon atoms to the ink composition can improve color development and can effectively prevent feathering or bleeding in prints and thus is considered to contribute to improved print quality. Further, the addition of the 1,2-alkanediol is considered to improve the storage stability of the ink composition, that is, the dispersion stability of the pigment, thereby preventing nozzle clogging. The amount of the 1,2-alkanediol added to the ink composition is generally about 0.5 to 20% by weight, preferably about 1 to 15% by weight, more preferably about 3 to 10% by weight, based on the ink composition.

According to a preferred embodiment of the present invention, the 1,2-alkanediol is used as a mixture thereof with glycerin. In this case, the total amount of glycerin and the 1,2-alkanediol added is more than 10% by weight to less than 30% by weight, preferably 15 to 25% by weight, based on the ink composition. The total amount of these materials in the above range can provide good printing stability and thus can effectively prevent disordered dot formation.

Glycerin

The ink composition according to the present invention preferably contains glycerin. Glycerin, when added in combination with the 1,2-alkanediol, can improve the dispersion stability of the pigment and thus can significantly improve the capability of preventing nozzle clogging. The amount of glycerin added is generally about 0.5 to 30% by weight, preferably about 5 to 15% by weight, based on the ink composition.

Colorant

The colorant contained in the ink composition according to the present invention is a pigment. Inorganic or organic pigments are usable as the pigment without particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, and aniline black. According to a preferred embodiment of the present invention, carbon black is used.

According to a preferred embodiment of the present invention, the pigment is dispersible and/or dissolvable in water without the aid of any dispersant. This pigment is such that the pigment has been surface treated so as to attach at least one functional group, selected from the group consisting of carbonyl, carboxyl, hydroxyl, and sulfonic acid groups or salts of the functional groups, to the surface of the pigment, thereby permitting the pigment to be dispersible and/or dissolvable in water without any dispersant. More specifically, this surface-modified carbon black may be prepared by grafting a functional group or a molecule containing a functional group onto the surface of carbon black by physical treatment, such as vacuum plasma, or chemical treatment (for example, oxidation with hypochlorous acid, sulfonic acid or the like). In the present invention, a single type or a plurality of types of functional groups may be grafted onto one carbon black particle. The type of the functional group to be grafted and the degree of grafting may be suitably determined by taking the dispersion stability in the ink, the color density, the drying property at the front face of the ink jet head and the like into consideration.

In the present invention, when the pigment is stably present in water without any dispersant, this state is expressed as the state of "dispersion and/or dissolution." Not infrequently, it is difficult to clearly distinguish the state of dissolution of a material from the state of dispersion of the material. In the present invention, any pigment can be used so far as the pigment is stably present in water without any dispersant independently of whether the pigment is in a dispersion form or a solution form. In the present specification, a pigment, which can stably exist in water without any dispersant is sometimes referred to as a "water-soluble pigment." The water-soluble pigment in this case, however, does not exclude a pigment which is in the state of dispersion.

According to a preferred embodiment of the present invention, the pigment has an average particle diameter of 50 to 200 nm.

The amount of the pigment added may be properly determined in such an amount range that can realize satisfactory image density. Preferably, however, the pigment is added in an amount of about 0.5 to 15% by weight based on the ink composition. In this amount range, requirements for print density, rubbing/scratch resistance, and drying to the touch on plain papers can be satisfied on a high level, and, at the same time, requirements for long-term and short-term anti-clogging properties, storage stability and other properties can be satisfied while enjoying a good balance among these properties.

Polyhydric Alcohol Derivative and/or Acetylene Glycol Surfactant

According to the present invention, the ink composition preferably contains a polyhydric alcohol derivative and/or an acetylene glycol surfactant. The polyhydric alcohol derivative and/or the acetylene glycol surfactant are added from the viewpoint of imparting satisfactory fast drying properties to the ink composition. From the viewpoint of preventing feathering or bleeding in prints, these components are greatly expected to function as a penetrating agent.

Specific examples of polyhydric alcohol derivatives include diethylene glycol mono-n-butyl ether, triethylene glycol mono-n-butyl ether, propylene glycol mono-n-butyl ether, and dipropylene glycol mono-n-butyl ether. They may be used alone or in a combination of two or more. The amount of the polyhydric alcohol derivative added is generally about 3 to 30% by weight, preferably about 5 to 10% by weight, based on the ink composition. The addition of the polyhydric alcohol derivative in an amount of not less than 3% by weight can improve the ability of the ink to penetrate the recording medium and can suppress feathering or bleeding in prints. On the other hand, the polyhydric alcohol derivative in an amount of less than 30% by weight facilitates drying of ink and can reduce the level of feathering or bleeding in prints.

Specific examples of preferred acetylene glycol surfactants usable in the present invention include compounds represented by formula (I):

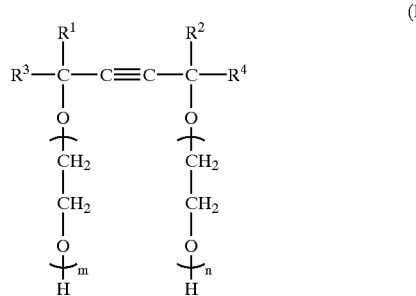

wherein $0 \leq m+n \leq 50$; and $R^1$, $R^2$, $R^3$, and $R^4$ each independently represent an alkyl group.

Among the compounds represented by formula (I), particularly preferred compounds include, for example, 2,4,7,9-tetramethyl-5-decyne-4,7-diol, 3,6-dimethyl-4-octyne-3,6-diol, and 3,5-dimethyl-1-hexyn-3-ol. Commercially available products may also be used as the compound represented by the formula (I). Specific examples thereof include Surfynol 104, Surfynol 82, Surfynol 465, Surfynol 485, and Surfynol TG (all the above products being available from Air Products and Chemicals Inc.). Among these commercially available products, Surfynol 465, Surfynol 104, and Surfynol TG are particularly preferred. The amount of acetylene glycol surfactant added may be properly determined by taking into consideration the amount of other water-soluble organic solvent and surfactant added. According to a preferred embodiment of the present invention, the amount of the acetylene glycol surfactant added is preferably about 0.1 to 3% by weight, more preferably about 0.5 to 1.5% by weight, based on the ink composition. The acetylene glycol surfactant in an amount of not less than 0.1% by weight has the effect of improving the print quality. On the other hand, the acetylene glycol surfactant in an amount of less than 3% by weight can prevent foaming or precipitation of ink in nozzles and thus can contribute to stable printing.

Some acetylene glycol surfactants, for example, the above-described Surfynol 104 and Surfynol TG, have low solubility in water due to low HLB. The solubility can be improved by adding a glycol ether, a glycol compound, a surfactant or the like to the ink composition.

Water-soluble Organic Solvent and Water

The ink composition according to the present invention comprises a water-soluble organic solvent and water as a main solvent.

Specific examples of water-soluble organic solvents usable in the present invention include ethylene glycol, diethylene glycol, triethylene glycol, tetraethylene glycol, propylene glycol, dipropylene glycol, tripropylene glycol, polyethylene glycol having a molecular weight of not more than 2,000, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. Preferred are diethylene glycol and thiodiglycol. These water-soluble organic solvents can advantageously improve the solubility of other components, constituting the ink composition, in the ink composition, can improve the ability of ink to penetrate recording media, for example, paper, and, in addition, can effectively prevent nozzle clogging. The amount of the water-soluble organic solvent added may be properly determined. The amount of the water-soluble organic solvent, however, is preferably about 1 to 30% by weight, more preferably about 5 to 15% by weight, based on the ink composition.

Triethanolamine/pH Adjustment

According to a preferred embodiment of the present invention, the ink composition according to the present invention contains triethanolamine. The addition of triethanolamine can bring the ink composition to a proper pH on the alkaline side and, in addition, can attain the effect of retaining moisture to effectively prevent nozzle clogging. Although the amount of triethanolamine added may be properly determined, the amount is preferably about 0.1 to 3% by weight.

The ink composition according to the present invention is preferably regulated in the pH range of 7 to 11, more preferably 7.5 to 9.5. When the pH is kept in this range, the pigment and, in addition, a resin emulsion described below can advantageously stably exist in the ink composition. The pH may be adjusted by the addition of triethanolamine, or by the addition of a proper alkali agent (for example, an organic alkali, such as ammonia, or an alkali metal salt). Preferred alkali agents include potassium hydroxide. The pH adjustment by the addition of triethanolamine in combination with potassium hydroxide is particularly preferred. In the combined use of triethanolamine and potassium hydroxide, the amount of potassium hydroxide added is preferably about 0.01 to 0.2% by weight.

Water-soluble Emulsion

According to a preferred embodiment of the present invention, the ink composition according to the present invention contains a water-soluble emulsion. The addition of the water-soluble emulsion can improve the fixation and rubbing/scratch resistance of prints. Preferably, this water-soluble emulsion comprises water as a continuous phase and one of or a mixed form of two or more of an acrylic resin, a methacrylic resin, a styrene resin, a urethane resin, an acrylamide resin, and an epoxy resin as a dispersed phase. In particular, the dispersed phase preferably comprises a resin composed mainly of acrylic acid and/or methacrylic acid. These resins are not limited by the form of the copolymer, and may be in the form of, for example, a block copolymer or a random copolymer. Further, the water-soluble emulsion usable in the ink composition according to the present invention preferably has a film-forming property, preferably a minimum film-forming temperature of room temperature or below, more preferably 0 to 20° C. When the minimum film-forming temperature falls within the above temperature range, the stability of ink and the drying to the touch of the printed area can be improved.

According to a preferred embodiment of the present invention, the resin component in the water-soluble emulsion is in the form of resin particles having a core/shell structure comprising a core and a shell surrounding the core. For example, a construction may be adopted wherein a resin component capable of improving the drying to the touch and the fixation of the ink is introduced into the core, and a resin component capable of allowing resin particles to stably exist in the ink composition is introduced into the shell. According to a preferred embodiment of the present invention, the core is formed of a resin having a crosslinked structure.

Materials usable for forming the core include styrene, tetrahydrofurfuryl acrylate, butyl methacrylate, ($\alpha$, 2, 3, or 4)-alkylstyrene, ($\alpha$, 2, 3, or 4)-alkoxystyrene, 3,4-dimethylstyrene, a -phenylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, (meth)acrylate of an ethyl, propyl, or butyl ester of diethylene glycol or polyethylene glycol, cyclohexyl (meth)acrylate, benzyl (meth)acrylate, phenoxyethyl (meth)acrylate, isobornyl (meth)acrylate, hydroxyalkyl (meth)acrylate, fluorine-, chlorine-, or silicon-containing (meth)acrylate, (meth) acrylamide, and maleic amide.

When a crosslinked structure is introduced in addition to the above (meth)acrylic acid, it is possible to use, for example, (mono, di, tri, tetra, or poly)ethylene glycol di(meth)acrylate, (meth)acrylates of 1,4-butanediol, 1,5-pentanediol, 1,6-hexanediol, 1,8-octanediol, 1,10-decanediol and the like, trimethylolpropane tri(meth) acrylate, glycerin (di or tri)(meth)acrylate, di(meth)acrylate of ethylene oxide adduct of bisphenol A or F, neopentyl glycol di(meth)acrylate, pentaerythritol tetra (meth)acrylate, and dipentaerythritol hexa(meth)acrylate.

For the formation of the shell, the same material as used in the formation of the core may be used.

Emulsifiers usable for the formation of the above polymeric fine particles include sodium laurylsulfate, potassium laurylsulfate, anionic surfactants, nonionic surfactants, and amphoteric surfactants, which are commonly used in the art.

Polymerization initiators usable herein include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide.

Chain transfer agents usable for the polymerization include t-dodecylmercaptan, n-dodecylmercaptan, n-octylmercaptan, xanthogen compound, such as dimethylxanthogendisulfide or diisobutylxanthogendisulfide, dipentene, indene, 1,4-cyclohexadiene, dihydrofuran, and xanthen.

According to a preferred embodiment of the present invention, the core is formed of an epoxy resin or a urethane resin, preferably a resin having a crosslinked structure. According to another preferred embodiment of the present invention, the core is formed of an acrylic acid resin and/or a methacrylic acid resin, preferably a resin having a crosslinked structure. The shell preferably has a structure having on its surface carboxyl groups derived from acryloyl groups and/or methacryloyl groups. Further, the functional groups on the surface of the shell preferably have been treated with an ammonium salt, an amine salt and/or an amide salt or other organic alkali from the viewpoint of allowing the resin particles to stably exist in the ink composition.

According to a preferred embodiment of the present invention, the molecular weight of the water-soluble emulsion is preferably not less than 1,000, more preferably about 10,000 to 100,000.

The water-soluble emulsion used in the present invention may be a commercially available one, and examples thereof include Z116 manufactured by Mitsui Toatsu Chemicals, Inc.

The amount of the water-soluble emulsion added may be properly determined. For example, it is preferably about 0.5 to 10% by weight, more preferably about 3 to 5% by weight.

Other Optional Ingredients

The ink composition of the present invention may contain, in addition to the above ingredients, other optional ingredients. Examples of other ingredients usable herein include nozzle clogging preventives, preservatives, antioxidants, electric conductivity adjustors, pH adjustors, viscosity modifiers, surface tension modifiers, and oxygen absorbers. Sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives or antimold in the ink of the present invention.

Surface Tension

The ink composition according to the present invention preferably has a surface tension of not more than 40 mNm$^{-1}$, more preferably not more than 40 mNm$^{-1}$.

Bringing the surface tension of the ink composition according to the present invention to the above value range can improve the penetration of the ink composition into paper and, in addition, can ensure the wettability of materials constituting the recording head by the ink in a well balanced manner. Consequently, the print quality and the reliability can be improved.

Ink Jet Recording Method Using Two Ink Compositions and Recording Apparatus

According to another aspect of the present invention, there is provided an ink jet recording method using two ink compositions. The ink jet recording method according to the present invention comprises performing printing using an ink composition containing a pigment as a colorant and an ink composition containing a dye as a colorant.

In the ink jet recording method according to the present invention, the order of the printing of the ink composition containing a pigment as the colorant and the ink composition containing a dye as the colorant on a recording medium may be properly determined by the recording medium used. Further, a method may also be used wherein the ink composition containing a pigment as the colorant and the ink composition containing a dye as the colorant are overprinted with each other on the recording medium.

The ink composition containing a dye as the colorant can realize the formation of a good image on specialty recording media for ink jet recording. Further, according to the present invention, the color development of a black image on plain papers is mainly realized by a black ink composition containing a pigment as the colorant. Therefore, in printing on plain papers, the dye concentration of the dye-containing black ink composition may be relatively low.

Further, in printing on plain papers, the dye-containing ink composition is printed before or after printing of the pigment-containing ink composition on the recording medium. Upon the contact of these two ink compositions with each other, the coagulation or thickening of the pigment-containing ink composition can suppress feathering and color bleeding to realize good images. Overprinting of these two ink compositions with each other on plain papers can realize the formation of images having high print density. According to a preferred embodiment of the present invention, the ink composition containing a dye as the colorant is first printed followed by printing of the ink composition containing a pigment as the colorant. Further, according to a preferred embodiment of the present invention, the use of a black ink composition containing a pigment as the colorant and a black ink composition containing a dye as the colorant can realize halftone black images. Specifically, for the low black density portion, only the black ink composition containing a dye as the colorant is printed, while for the high black density portion, the two black ink compositions are overprinted with each other. This can realize high print quality, especially print quality comparable with photographs. In this connection, it is a matter of course that a color ink may be separately provided to form a color image on plain paper. According to a preferred embodiment of the present invention, the ink composition containing a pigment as the colorant according to the present invention is used as a black ink composition in combination with the dye-containing ink composition according to the present invention as a color ink (for example, yellow, magenta, or cyan ink).

According to another embodiment of the present invention, the dye-containing ink composition according to the present invention may be used as a color ink in combination with the ink composition containing a pigment as the colorant according to the present invention as a color ink composition containing a component which can coagulate or thicken the pigment-containing ink composition. This embodiment can advantageously effectively prevent bleeding between printed black and color inks.

An apparatus for carrying out the ink jet recording method according to the present invention will be described with reference to the accompanying drawing. FIG. 1 is a schematic diagram showing the construction of the ink jet recording apparatus according to a preferred embodiment of the present invention. A printer 1 holds a recording medium 2. The printer 1 comprises a sheet feed motor 11 and a platen roller 12, linked with the sheet feed motor 11, as a recording medium carrying means for carrying the recording medium 2 in a direction indicated by an arrow A in the drawing. The printer 1 further comprises a carriage 21 loaded with a tank 31 for a pigment-containing ink composition, a recording head 32 as printing means for ejecting the pigment-containing ink composition, a tank 33 for a dye-containing ink composition, a recording head 34 as printing means for ejecting the dye-containing ink composition, an ink tank 40 for reservoiring an yellow ink, a magenta ink, and a cyan ink, and recording heads 41, 42, and 43 as ink composition printing means respectively for ejecting the yellow ink, the magenta ink, and the cyan ink. The carriage 21 is constructed so that it can be slid on a sliding shaft 13 provided parallel to the shaft of the platen roller 12, and reciprocated in a direction indicated by an arrow B in the drawing. The carriage 21 is connected to a carriage belt 22 which is installed on a carriage motor 23 and a pulley 24. Rotation of the motor 23 permits the carriage 21 to be reciprocated.

According to a preferred embodiment of the present invention, the printer 1 further comprises a sensor 51 for detecting the presence of a plain paper, a recycled paper, or a specialty recording medium for ink jet recording (for example, a gloss layer and/or a recording medium having an ink-receptive layer) as the recording medium 2. The sheet feed motor 11, the carriage motor 23, the recording heads 32, 34, 41, 42, and 43, and the sensor 51 are coupled to a control circuit 60 which controls the operation of these elements.

For example, in printer 1, as soon as the control circuit 60 receives, from the sensor 51, a signal informing that the recording medium 2 is a specialty recording medium for ink jet recording, the recording head 34 ejects the dye-containing ink composition to perform printing, and, in addition, according to need, printing is performed using the recording heads 41, 42, and 43 as ink composition printing means respectively for ejecting the yellow ink, the magenta ink, and the cyan ink. In this case, the recording head 32 as printing means for ejecting the pigment-containing ink composition is not operated. On the other hand, as soon as the control unit 60 receives, from the sensor 51, a signal informing that the recording medium 1 is plain paper, the recording head 34 ejects the dye-containing ink composition to perform printing, and, in addition, the pigment-containing ink composition is ejected from the recording head 32 so that the two ink compositions are overprinted with each other. Further, according to need, printing is performed using the recording heads 41, 42, and 43 as ink composition printing means respectively for ejecting the yellow ink, the magenta ink, and the cyan ink. According to the recording apparatus of the present invention, the recording means may be properly selected to perform printing, depending upon the recording medium and the applications of prints. In this connection, it should be noted that the above recording apparatus is one embodiment of the recording apparatus according to the present invention, and should not be construed as limiting the scope of the recording apparatus according to the present invention.

An ink, which may contain a pigment as the colorant, having a relatively high content of a solid, like the ink composition of the present invention, when placed in a nozzle without ejection for a long period of time, is likely to dry at the front face of the nozzle to cause thickening, leading to an ink droplet trajectory directionality problem. In this case, slightly moving the ink with care not to cause the ink to be delivered from the front face of the nozzle can stir the ink, permitting the ink to be stably ejected. This can be achieved by pressurizing the ink, by means of pressurizing means for ejecting the ink, with care not to cause the ink to be ejected. In the above regulation, the use of an electrostrictive element as the pressurizing means is preferred from the viewpoint of easy regulation. Utilization of this mechanism can increase the content of the pigment in the ink, permitting a high color density to be provided using a pigment-based ink and, in addition, the ink to be stably ejected.

When the above slight moving of the ink is carried out in the nozzle face of an ink jet recording apparatus, this operation is effective for an ink composition having a pigment content of about 5 to 15% by weight, more preferably about 7 to 10% by weight.

In use, the ink composition of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the amount of these materials absorbed. Further, the polyurethane foam can ensure a negative pressure by using the ink composition of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, the use of a polyurethane foam comprising a polyfunctional isocyanate, such as tolylene diisocyanate or m-xylylene diisocyanate, and a material having a plurality of hydroxy groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

Pigment-containing Ink Composition

In the ink jet recording method using two ink compositions according to the present invention, an ink composition containing a pigment as a colorant is used. Preferably, this pigment-containing ink composition is the ink composition according to the present invention as described above. The pigment-containing ink composition may be prepared as described above in connection with the ink composition according to the present invention.

Dye-containing Ink Composition

In the ink jet recording method using two ink compositions according to the present invention, an ink composition containing a dye as a colorant is used.

Dye

According to the present invention, the dye is not particularly limited. For example, dyes, which fall into categories of water-soluble acidic dyes, direct dyes, basic dyes, and reactive dyes according to the color index, may be preferably used. According to the present invention, this second ink composition may be either a black ink or a color ink, or alternatively, may be both a black ink and a color ink. Although the amount of the dye added is not particularly limited, the amount is preferably about 0.1 to 20% by weight based on the ink composition.

Ingredient for Coagulation or Thickening

According to a preferred embodiment of the present invention, the dye-containing ink composition contains an ingredient which coagulates or thickens the pigment-containing ink composition. Examples of ingredients capable of coagulating or thickening the pigment-containing ink composition include cationic materials, organic salts, and inorganic salts. Specific examples of cationic materials include primary, secondary, tertiary, and quaternary amines and compounds having, in the molecule thereof, ammonium, phosphorus, or phosphonium. Specific examples of organic salts usable herein include polyallylamine salts and polyethyleneimine salts. Specific examples of inorganic salts include salts using, as cation species, metal ions of an alkali metal, an alkaline earth metal, aluminum, zinc, chromium, copper, nickel, or iron. The amount of these ingredients added may be properly determined. Preferably, however, the above ingredient is added in an amount of about 0.5 to 5% by weight based on the ink composition.

Glycol Eether

According to a preferred embodiment of the present invention, the ink composition containing a dye as the colorant contains a glycol ether. The addition of the glycol ether can enhance the ability of the ink composition to penetrate recording media, and thus can be expected to realize the formation of prints having no significant feathering or bleeding on various recording media.

The glycol ether is preferably one of or a mixture of two or more of diethylene glycol mono-n-butyl ether, triethylene glycol mono-n-butyl ether, propylene glycol mono-n-butyl ether, and dipropylene glycol mono-n-butyl ether. Although the amount of the glycol ether added may be properly determined, the amount is preferably about 3 to 30% by weight, more preferably about 5 to 10% by weight. According to a preferred embodiment of the present invention, some of these glycol ethers have low solubility in water. The solubility may be improved by adding other highly water-soluble glycol ethers, diols and glycols, such as thiodiglycol, 1,4-butanediol, 1,5-pentanediol, or propylene glycol, or surfactants.

Acetylene Glycol Surfactant

According to another preferred embodiment of the present invention, the ink composition containing a dye as the colorant contains an acetylene glycol surfactant. The addition of the acetylene glycol surfactant can enhance the ability of the ink composition to penetrate recording media, and thus can be expected to realize the formation of prints having no significant feathering or bleeding on various recording media.

Examples of preferred acetylene glycol surfactants usable in the present invention include compounds represented by formula (I):

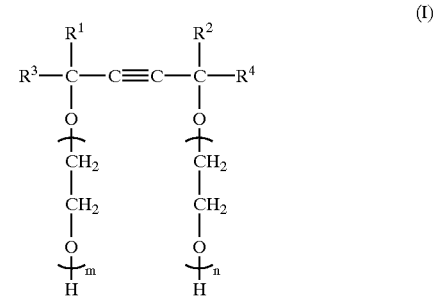

wherein $0 \leq m+n \leq 50$; and $R^1$, $R^2$, $R^3$, and $R^4$ each independently represent an alkyl group.

Among the compounds represented by formula (I), particularly preferred compounds include, for example, 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by the formula (I). Specific examples thereof include Surfynol 104, Surfynol 82, Surfynol 465, Surfynol 485, and Surfynol TG (all the above products being available from Air Products and Chemicals Inc.), and Olfine STG and Olfine E1010 (tradenames of products available from Nissin Chemical Industry Co., Ltd.).

According to a preferred embodiment of the present invention, the amount of the acetylene glycol surfactant added is preferably about 0.3 to 2% by weight, more preferably 0.5 to 1.5 % by weight, based on the total amount of the ink. When the amount of the acetylene glycol surfactant added falls within the above amount range, images having a lower level of feathering or bleeding can be realized.

Some of the acetylene glycol surfactants, for example, the above-described Surfynol 104 and Surfynol TG, have low solubility in water due to low HLB. The solubility can be improved by adding a glycol ether, a glycol compound, a surfactant or the like to the ink composition.

Polyhydric Alcohols

According to a preferred embodiment of the present invention, the dye-containing ink composition contains a polyhydric alcohol from the viewpoint of preventing nozzle clogging. Specific examples of polyhydric alcohols usable herein include ethylene glycol, diethylene glycol, triethylene glycol, tetraethylene glycol, propylene glycol, dipropylene glycol, tripropylene glycol, polyethylene glycol having a molecular weight of not more than 2,000, 1,3-propylene glycol, isopropylene glycol, isobutylene glycol, 1,4-butanediol, 1,3-butanediol, 1,5-pentanediol, 1,6-hexanediol, glycerin, thiodiglycol, mesoerythritol, and pentaerythritol. Among others, glycerin, 1,5-pentanediol, diethylene glycol, and thiodiglycol, and mixtures of two or more of these polyhydric alcohols are preferred because they can properly regulate the viscosity of the ink composition, can effectively prevent nozzle clogging, and can increase the clouding point of the ink composition. Further, the addition of the polyhydric alcohol can enjoy an additional advantage that the solubility of the acetylene glycol surfactant (particularly Surfynol 104 and Surfynol TG) in the ink composition can be improved and the ink composition, even when placed under high temperature conditions, does not cause phase separation. The amount of the polyhydric alcohol added may be properly determined. The amount of the polyhydric alcohol, however, is preferably 1 to less than 30% by weight, more preferably about 5 to 15% by weight, based on the ink composition.

Saccharides

According to a preferred embodiment of the present invention, the dye-containing ink composition contains a saccharide. The addition of the saccharide can effectively prevent the ink from drying at the front end of nozzles and thus can prevent nozzle clogging. Examples of saccharides usable herein include monosaccharides and polysaccharides. Specific examples thereof include glucose, mannose, fructose, ribose, xylose, arabinose, lactose, galactose, aldonic acid, glucitol, maltose, cellobiose, sucrose, trehalose, and maltotriose, and, in addition, alginic acid and salts thereof, cyclodextrins, and celluloses. Although the amount of the saccharide added may be properly determined, the amount is preferably 0.05 to 10% by weight. Further, according to a preferred embodiment of the present invention, in the case of glucose, mannnose, fructose, ribose, xylose, arabinose, lactose, galactose, aldonic acid, glucitol, maltose, cellobiose, sucrose, trehalose, and maltotriose, the amount added is about 3 to 10% by weight. The addition of alginic acid or salts thereof, cyclodextrins, or celluloses is likely to easily increase the viscosity of the ink composition. Therefore, the addition of these materials in an excessive amount should be avoided.

Water-soluble Organic Solvent

The dye-containing ink composition according to the present invention may contain a water-soluble organic solvent. Specific examples of water-soluble organic solvents include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; formamide; acetamide; dimethyl sulfoxide; sorbit; sorbitan; acetin; diacetin; triacetin; and sulfolane. These water-soluble organic solvents can advantageously improve the solubility of other ingredients in the ink composition, can improve the ability of the ink composition to penetrate recording media, for example, paper, and, in addition, can effectively prevent nozzle clogging. The amount of the organic solvent added may be properly determined. The amount of the organic solvent, however, is preferably about 0.1 to 60% by weight, more preferably about 5 to 15% by weight, based on the ink composition.

Surfactant

The dye-containing ink composition according to the present invention may contain a surfactant from the viewpoint of regulating the penetration of the ink composition into recording media. The surfactant is preferably compatible with other ingredients in the ink composition. Surfactants usable herein include amphoteric surfactants and nonionic surfactants. Examples of amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids.

Other Optional Ingredients

The dye-containing ink composition according to the present invention may contain, in addition to the above ingredients, other optional ingredients. Examples of other ingredients usable herein include nozzle clogging preventives, preservatives, antioxidants, electric conductivity adjustors, pH adjustors, viscosity modifiers, surface tension modifiers, and oxygen absorbers. Sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives or antimold in the ink of the present invention.

Examples of pH adjustors, solubilizers, or antioxidants usable in the ink compositions include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

Further, the dye-containing ink composition according to the present invention may contain antioxidants and ultraviolet absorbers, and examples thereof include: Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

EXAMPLES

The following examples further illustrate the present invention, but should not be construed as limiting the scope of the present invention.

Preparation of Water-soluble Pigment

Carbon blacks, which had been dispersed by oxidation of the surface of carbon blacks with hypochlorous acid, were used as a water-soluble pigment. Specifically, water-soluble pigments prepared by the following treatment method were used.

A commercially available carbon Black [MA-100 (primary particle diameter 24 nm, specific surface area 137 $m^2/g$, pH 3.5 (acidic) manufactured by Mitsubishi Chemical Corporation] was thoroughly mixed in an amount of 300 g with 1,000 ml of water. The mixture was finely dispersed, and 450 g of sodium hypochlorite (available chlorine 12%) was added dropwise to the dispersion, and the mixture was stirred at 100 to 105° C. for 10 hr. The resultant slurry was filtered through Toyo filter paper No. 2 (manufactured by Advantec Toyo Kaisha Ltd.), and the pigment particles were then thoroughly washed with water. The pigment wet cake thus obtained was redispersed in 3,000 ml of water. The dispersion was desalted through a reverse osmosis membrane to an electrical conductivity of 0.2 mS. Further, this pigment dispersion (pH 6.5) was concentrated to a pigment concentration of 10% by weight. The above procedure was repeated, except that different types of carbon black were used. Thus, water-soluble pigments having different particle diameters were prepared. Water-soluble pigments 1 to 3 and 6 different from one another in average particle diameter were used respectively in Examples 1 to 3 and 6.

Preparation of Emulsion

Emulsion A is a core/shell type emulsion wherein the core has a structure which is formed of a crosslinked polymer using glycidoxide-containing acrylic and the shell has a structure having on its surface carboxyl groups derived from acryloyl groups introduced by the polymerization of acrylic acid.

Emulsion B is a core/shell type emulsion wherein the core is formed of a crosslinked structure of a copolymer using glycidoxide-containing acrylic acid and methacrylic acid and the shell has a structure having on its surface carboxyl groups derived from acryloyl groups, introduced by the polymerization of acrylic acid, and amido groups derived from acrylamide.

In the following examples, 0.1 to 1% by weight of Proxel XL-2 as a corrosion preventive for ink and 0.001 to 0.05% by weight of benzotriazole as a corrosion preventive for an ink jet head member were added to ion-exchanged water as the balance. "EO" in p-toluenesulfonamide-EO adduct is ethylene oxide.

Preparation of Ink Compositions

Ink compositions were prepared according to the following formulations. All the ingredients except for triethanolamine were mixed together. Triethanolamine as a pH adjustor was then added to the mixture, followed by stirring for 2 hr. Thereafter, the mixture was filtered through a stainless steel filter having a pore diameter of 5 μm. Thus, ink compositions for ink jet recording were prepared. Ink compositions in Examples 4 and 5 and Comparative Example 4 were prepared by a production process commonly used in the production of conventional dye ink compositions.

|  | Amount added (wt %) |
| --- | --- |
| Example 1 | |
| Water-soluble pigment 1 (average particle diameter 145 nm) | 6.0 |
| Surfynol 465 | 1.0 |
| Diethylene glycol monobutyl ether | 5.0 |
| 1, 2-Hexanediol | 3.0 |
| Glycerin | 15.0 |
| Diethylene glycol | 5.0 |
| Triethanolamine | 0.8 |
| Ion-exchanged water | Balance |
| Example 2 | |
| Water-soluble pigment 2 (average particle diameter 105 nm) | 7.5 |
| Surfynol 465 | 1.0 |
| Diethylene glycol monobutyl ether | 10.0 |
| 1, 2-Hexanediol | 5.0 |
| Glycerin | 12.0 |
| 2-Pyrrolidone | 6.0 |
| Thiodiglycol | 4.0 |
| Triethanolamine | 1.0 |
| Ion-exchanged water | Balance |
| Example 3 | |
| Water-soluble pigment 3 (average particle diameter 90 nm) | 10.0 |
| Surfynol TG | 0.2 |
| 1, 2-butanediol | 15.0 |
| Glycerin | 10.0 |
| Diethylene glycol | 3.0 |
| 1, 5-Pentanediol | 7.5 |
| Emulsion A (average particle diameter 100 nm) | 2.5 |
| Triethanolamine | 0.5 |
| Ion-exchanged water | Balance |
| Example 4 | |
| Byacript Black Sp (a product of Bayer) | 7.0 (on solid basis) |
| Triethylene glycol monobutyl ether | 10.0 |
| 1, 2-Pentanediol | 3.0 |
| Glycerin | 15.0 |
| Diethylene glycol | 5.0 |
| Thiodiglycol | 5.0 |
| Triethanolamine | 1.5 |
| Ion-exchanged water | Balance |

-continued

| | Amount added (wt %) |
|---|---|
| Example 5 | |
| Food Black 2 | 5.0 |
| Surfynol 465 | 1.2 |
| 1, 2-Hexanediol | 10.0 |
| Glycerin | 5.0 |
| Diethylene glycol | 15.0 |
| Triethanolamine | 0.9 |
| Ion-exchanged water | Balance |
| Example 6 | |
| Water-soluble pigment 4 | 5.0 |
| (average particle diameter 60 nm) | |
| Surfynol 465 | 0.3 |
| Diethylene glycol monobutyl ether | 7.5 |
| 1, 2-Butanediol | 5.0 |
| Emulsion B | 2.0 |
| (average particle diameter 120 nm) | |
| Glycerin | 15.0 |
| 2-Pyrrolidone | 10.0 |
| Triethanolamine | 0.5 |
| Ion-exchanged water | Balance |
| Comparative Example 1 | |
| Water-soluble pigment 1 | 6.0 |
| (average particle diameter 145 nm) | |
| Surfynol 465 | 1.0 |
| Diethylene glycol monobutyl ether | 5.0 |
| Glycerin | 15.0 |
| Diethylene glycol | 5.0 |
| Triethanolamine | 0.8 |
| Ion-exchanged water | Balance |
| Comparative Example 2 | |
| Water-soluble pigment 2 | 7.5 |
| (average particle diameter 105 nm) | |
| Surfynol 465 | 1.0 |
| Diethylene glycol monobutyl ether | 10.0 |
| 1, 2-Hexanediol | 10.0 |
| 2-Pyrrolidone | 6.0 |
| Thiodiglycol | 4.0 |
| Triethanolamine | 1.0 |
| Ion-exchanged water | Balance |
| Comparative Example 3 | |
| Water-soluble pigment 3 | 10.0 |
| (average particle diameter 90 nm) | |

-continued

| | Amount added (wt %) |
|---|---|
| Surfynol TG | 0.2 |
| Diethylene glycol | 20.0 |
| 1, 5-Pentanediol | 7.5 |
| Emulsion A | 2.5 |
| (average particle diameter 100 nm) | |
| Triethanolamine | 0.5 |
| Ion-exchanged water | Balance |
| Comparative Example 4 | |
| Byacript Black Sp (a product of Bayer) | 7.0 |
| | (on solid basis) |
| Triethylene glycol monobutyl ether | 10.0 |
| 1, 2-Pentanediol | 7.0 |
| Diethylene glycol | 15.0 |
| Thiodiglycol | 5.0 |
| Triethanolamine | 1.5 |
| Ion-exchanged water | Balance |

Surface Tension

For the ink compositions of Examples 1 to 6 and Comparative Examples 1 to 4, the surface tension was measured with an automatic tensiometer (CBVP-A3) at 20° C. The results were as summarized in Table 1.

TABLE 1

| Example/surface tension | (mNm$^{-1}$) |
|---|---|
| Ex. 1 | 31.4 |
| Ex. 2 | 32.1 |
| Ex. 3 | 29.8 |
| Ex. 4 | — |
| Ex. 5 | — |
| Ex. 6 | 30.8 |
| Comp. Ex. 1 | 32.7 |
| Comp. Ex. 2 | 32.5 |
| Comp. Ex. 3 | 34.6 |
| Comp. Ex. 4 | — |

Preparation of Ink Sets

Ink sets composed of black ink (pigment Bk, dye Bk), yellow ink (Y), magenta ink (M), and cyan ink (C) shown in Table 2 below were prepared, and used in evaluation 2 in the following print evaluation test.

TABLE 2

| | Set 1 | | | | | Set 2 | | | | | Set 3 | | | | | Set 4 | | | |
|---|---|---|---|---|---|---|---|---|---|---|---|---|---|---|---|---|---|---|---|
| | Pigment Bk | Dye Bk | Y | M | C | Pigment Bk | Dye Bk | Y | M | C | Pigment Bk | Dye Bk | Y | M | C | Pigment Bk | Y | M | C |
| C.I. Direct Yellow 86 | Ex. 1 | Ex. 4 | 2 | | | Ex. 2 | Ex. 5 | | | | Ex. 3 | Ex. 5 | | | | Ex. 6 | 2 | | |
| C.I. Direct Yellow 132 | | | | | | | | 2.5 | | | | | | | | | | | |
| C.I. Acid Yellow 23 | | | | | | | | | | | | | 3 | | | | | | |
| C.I. Acid Red 52 | | | | 2 | | | | | | | | | | | | | | 2 | |
| C.I. Acid Red 254 | | | | | | | | | 2.5 | | | | | | | | | | |
| C.I. Reactive Red 180 | | | | | | | | | | | | | | 3.5 | | | | | |
| C.I. Direct Blue 199 | | | | | 2.5 | | | | | | | | | | 1.5 | | | | 2.5 |
| C.I. Acid Blue 9 | | | | | | | | | | 2 | | | | | 2.5 | | | | |

TABLE 2-continued

| | | | | | | | | | | | | | |
|---|---|---|---|---|---|---|---|---|---|---|---|---|---|
| Diethylene glycol monobutyl ether | 8 | 8 | 8 | | | | 8 | 8 | 8 | 8 | 8 | 8 |
| Triethylene glycol monobutyl ether | | | | 7 | 7 | 7 | | | | | | |
| Olfine STG | 0.8 | 1 | 0.9 | | | | | | | 0.8 | 1 | 0.9 |
| Olfine E 1010 | | | | 1 | 0.8 | 0.7 | 1.6 | 1.6 | 1.6 | | | |
| Glycerin | | 8 | 15 | 6 | | 8 | 10 | 13 | 16 | | 8 | 15 |
| Diethylene glycol | 20 | 8 | | 5 | 21 | 7 | 10 | 5 | 8 | 20 | 8 | |
| 2-Pyrrolidone | | | | | | 5 | | | | | | |
| Urea | | 8 | | 5 | | | | 4 | | | 8 | |
| Danfix 723* | | | | | | | | | | | | |
| PAS-M-1** | | | | 2 | 2 | 2 | | | | | | |
| Magnesium nitrate | | | | | | | 5 | 5 | 5 | | | |
| Ethanol | | | | 0.9 | 0.9 | 0.9 | 0.9 | 0.9 | 0.9 | | | |
| Triethanolamine | | | | | | | | | | | | |
| Potassium hydroxide | | | | 0.2 | 0.2 | 0.4 | 0.2 | 0.1 | 0.2 | | | |
| Pure water | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 |

| | Comparative set 1 | | | | | Comparative set 2 | | | | | Comparative set 3 | | | | |
|---|---|---|---|---|---|---|---|---|---|---|---|---|---|---|---|
| | Pigment Bk | Dye Bk | Y | M | C | Pigment Bk | Dye Bk | Y | M | C | Pigment Bk | Dye Bk | Y | M | C |
| C.I. Direct Yellow 86 | Comp. Ex. 1 | Comp. Ex. 4 | 2 | | | Comp. Ex. 2 | Comp. Ex. 4 | | | | Comp. Ex. 3 | Comp. Ex. 4 | | | |
| C.I. Direct Yellow 132 | | | | | | | | 2.5 | | | | | | | |
| C.I. Acid Yellow 23 | | | | | | | | | | | | | 3 | | |
| C.I. Acid Red 52 | | | | 2 | | | | | | | | | | | |
| C.I. Acid Red 254 | | | | | | | | | 2.5 | | | | | | |
| C.I. Reactive Red 180 | | | | | | | | | | | | | | 3.5 | |
| C.I. Direct Blue 199 | | | | | 2.5 | | | | | | | | | | 1.5 |
| C.I. Acid Blue 9 | | | | | | | | | | 2 | | | | | 2.5 |
| Diethylene glycol monobutyl ether | | | 8 | 8 | 8 | | | | | | | | 8 | 8 | 8 |
| Triethylene glycol monobutyl ether | | | | | | | | 7 | 7 | 7 | | | | | |
| Olfine STG | | | 0.8 | 1 | 0.9 | | | | | | | | | | |
| Olfine E 1010 | | | | | | | | 1 | 0.8 | 0.7 | | | 1.6 | 1.6 | 1.6 |
| Glycerin | | | | 8 | 15 | | | 6 | | 8 | | | 10 | 13 | 16 |
| Diethylene glycol | | | 20 | 8 | | | | 5 | 21 | 7 | | | 10 | 5 | 8 |
| 2-Pyrrolidone | | | | | | | | | | 5 | | | | | |
| Urea | | | | 8 | | | | 5 | | | | | | 4 | |
| Danfix 723* | | | | | | | | | | | | | | | |
| PAS-M-1** | | | | | | | | 2 | 2 | 2 | | | | | |
| Magnesium nitrate | | | | | | | | | | | | | 5 | 5 | 5 |
| Ethanol | | | | | | | | | | | | | | | |
| Triethanolamine | | | | | | | | 0.9 | 0.9 | 0.9 | | | 0.9 | 0.9 | 0.9 |
| Potassium hydroxide | | | | | | | | 0.2 | 0.2 | 0.4 | | | 0.2 | 0.1 | 0.2 |
| Pure water | | | Balance | Balance | Balance | | | Balance | Balance | Balance | | | Balance | Balance | Balance |
| Total | | | 100 | 100 | 100 | | | 100 | 100 | 100 | | | 100 | 100 | 100 |

*, **Polyallylamine manufactured by Nitto Boseki Co. Ltd.

Print Evaluation Test

The ink compositions prepared in the examples and comparative examples were evaluated for the following items. The ink composition was loaded into a printer prepared by improving an ink jet printer MJ-930C (manufactured by Seiko Epson Corp.), followed by printing on recording media. Six recording media, Conqueror, Modo Copy, Xerox 4024, Hammermill Copyplus, Ricopy 6200, and Xerox P papers, were used in the test.

Evaluation 1: Print Quality 1

The black ink compositions prepared in the examples and the comparative examples were used to print texts and photograph-like images in a superfine mode on the recording media. The print quality was evaluated according to the following criteria. The results were as summarized in Table 3 below.

A: For all the papers, the prints were free from feathering and had good blackness.

B: Although feathering and unevenness in blotted image portions were observed for some papers, the level of the feathering and the level of the unevenness were acceptable for all the papers.

C: For at least some papers, significant feathering and unevenness in blotted image portions on unacceptable levels were observed.

Evaluation 2: Print Quality 2

The ink sets (ink sets 1 to 4 and comparative ink sets 1 to 3) shown in Table 2 below were used to print texts in a superfine mode on the recording media. The prints were evaluated for bleeding at the boundary areas between the printed black ink and the printed color ink according to the following criteria. The results were as summarized in Table 4 below.

A: For all the papers, the prints were substantially free from bleeding.

B: Although bleeding was observed for some papers, the level of the bleeding was satisfactory for all the papers.

C: For at least some papers, significant bleeding on an unacceptable level was observed.

Evaluation 3: Long-term Anti-clogging Property

The ink composition was loaded into the printer, and normal ejection of ink through each nozzle was confirmed as a clogging check pattern. Thereafter, in this state, the printer was allowed to stand without capping for two weeks in an environment of 40° C. Return to normal ejection of ink through the nozzles was evaluated according to the following criteria. The results were as summarized in Table 3 below.

A: After carrying out cleaning operation twice or less, ejection of ink through all the nozzles was returned to the normal state to perform normal printing.

B: After the repetition of cleaning operation five times or less, ejection of ink through all the nozzles was returned to the normal state to perform normal printing.

C: For some nozzles, ejection of ink could not be returned to the normal state, even after the repetition of cleaning operation.

Evaluation 4: Short-term Anti-clogging Property

The ink composition was loaded into the printer, and normal ejection of ink through each nozzle was confirmed as a clogging check pattern. Thereafter, in this state, the printer was allowed to stand without capping for one week in an environment of 40° C. Return to normal ejection of ink through the nozzles was evaluated according to the following criteria. The results were as summarized in Table 3 below.

A: All the nozzles could eject ink without cleaning operation to perform normal printing.

B: Most of the nozzles could eject ink without cleaning operation, and, after carrying out cleaning operation once, all the nozzles could eject ink to perform normal printing.

C: Normal printing could not be performed without cleaning operation, and, after carrying out cleaning operation once, all the nozzles could eject ink to perform normal printing.

Evaluation 5: Printing Stability

The ink composition was loaded into the printer, and normal ejection of ink through each nozzle was confirmed as a clogging check pattern. Thereafter, in order to evaluate the printing stability, an evaluation pattern constituted by combined character, line and other patterns was continuously printed. In this case, the ink was used up, replacement of the ink was carried out according to a replacement sequence. Thus, printing was carried out on 3,000 sheets of paper. The prints were inspected for dropouts and ink droplet trajectory directionality problem, and the printing stability was evaluated according to the following criteria. The results were as summarized in Table 3 below.

A: The frequency of the ink droplet trajectory directionality problem and the droplets was less than 5 times.

B: The frequency of the ink droplet trajectory directionality problem and the droplets was 5 to 10 times.

C: The frequency of the ink droplet trajectory directionality problem and the droplets was more than 10 times.

TABLE 3

| Ink/Evaluation | 1 | 3 | 4 | 5 |
|---|---|---|---|---|
| Ex. 1 | A | B | A | A |
| Ex. 2 | A | B | B | A |
| Ex. 3 | A | A | A | A |
| Ex. 4 | — | B | B | A |
| Ex. 5 | — | A | A | A |
| Ex. 6 | A | B | A | A |
| Comp. Ex. 1 | B | C | C | A |
| Comp. Ex. 2 | A | C | C | B |
| Comp. Ex. 3 | C | C | C | C |
| Comp. Ex. 4 | — | B | B | C |

TABLE 4

| Set/evaluation 2 | Evaluation |
|---|---|
| Set 1 | A |
| Set 2 | A |
| Set 3 | A |
| Set 4 | A |
| Comp. Set 1 | B |
| Comp. Set 2 | A |
| Comp. Set 3 | C |

What is claimed is:

1. An ink composition for ink jet recording, comprising at least a pigment, a 1,2-alkanediol, glycerin, a polyhydric alcohol derivative and/or an acetylene glycol surfactant, a water-soluble organic solvent, and water, said pigment having been surface treated to render the pigment dispersible and/or dissolvable in water without any dispersant, said 1,2-alkanediol being at least one member selected from the group consisting of 1,2-butanediol, 1,2-pentanediol, and 1,2-hexanediol, said ink composition having a surface tension of not more than 40 mNm$^{-1}$ at 20° C.

2. The ink composition according to claim 1, wherein the content of the 1,2-alkanediol is 0.5 to 30% by weight based on the ink composition.

3. The ink composition according to claim 1, wherein the content of glycerin is 0.5 to 30% by weight based on the ink composition.

4. The ink composition according to claim 1, wherein the surface of said pigment has been oxidized to render the pigment dispersible and/or dissolvable in water without any dispersant.

5. The ink composition according to claim 4, wherein the surface of said pigment has been oxidized so as to attach at least one functional group, selected from the group consisting of carbonyl, carboxyl, hydroxyl, and sulfonic acid groups or salts of said functional groups, to the surface of the pigment, thereby permitting the pigment to be dispersible and/or dissolvable in water without any dispersant.

6. The ink composition according to claim 1, wherein the content of the pigment is 0.5 to 10% by weight based on the ink composition.

7. The ink composition according to claim 1, wherein the pigment has an average particle diameter of 50 to 200 nm.

8. The ink composition according to claim 1, wherein the acetylene glycol surfactant is a compound represented by formula (I):

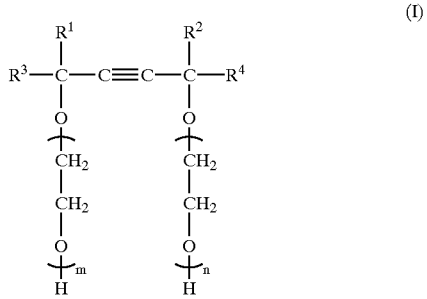

wherein $0 \leq m+n \leq 50$; and $R^1$, $R^2$, $R^3$, and $R^4$ each independently represent an alkyl group.

9. The ink composition according to claim 1, which further comprises a water-soluble resin emulsion.

10. The ink composition according to claim 9, wherein the water-soluble emulsion comprises a resin composed mainly of acrylic acid and/or methacrylic acid.

11. The ink composition according to claim 9, wherein the water-soluble emulsion comprises resin particles having a core/shell structure comprising a core and a shell surrounding the core.

12. The ink composition according to claim 11, wherein the core is formed of an epoxy resin, a urethane resin, an acrylic acid resin and/or a methacrylic acid resin, and the shell is formed of a resin having on its surface carboxyl groups in acrylic acid and/or methacrylic acid.

13. The ink composition according to claim 11, wherein the resin constituting the core has a crosslinked structure.

14. An ink jet recording method comprising the steps of: ejecting droplets of an ink composition; and depositing the droplets onto a recording medium to perform printing, the ink composition being one according to claim 1.

15. An ink jet recording method comprising the steps of: ejecting droplets of an ink composition; and depositing the droplets onto a recording medium to perform printing, wherein the ink composition according to claim 1 containing a pigment as the colorant and an ink composition containing a dye as a colorant are used to perform printing.

16. The recording method according to claim 15, wherein the ink composition containing a dye as the colorant further contains a glycol ether and/or an acetylene glycol surfactant.

17. The recording method according to claim 15, wherein the ink composition containing a dye as the colorant further contains a component which functions to coagulate or thicken the ink composition containing a pigment as the colorant.

18. The recording method according to claim 17, wherein the component, which functions to coagulate or thicken the ink composition containing a pigment as the colorant, is a cationic material, an organic salt, or an inorganic salt.

19. The recording method according to claim 15, wherein
the ink composition containing a pigment as the colorant is a black ink composition, and
the ink composition containing a dye as the colorant is a color ink composition.

20. The recording method according to claim 15, wherein
the ink composition containing a pigment as the colorant is a black ink composition, and
the ink composition containing a dye as the colorant is a black ink composition.

21. The recording method according to claim 15, wherein the ink composition containing a dye as the colorant is first printed followed by printing of the ink composition containing a pigment as the colorant.

22. An ink set for use in the recording method according to claim 15, said ink set comprising: the ink composition containing a pigment as the colorant; and ink composition containing a dye as a colorant.

23. A record printed by the recording method according to claim 14.

24. An ink jet recording apparatus for practicing the ink jet recording method according to claim 15, said ink jet recording apparatus comprising:
recording medium-carrying means for holding and carrying a recording medium;
means for depositing on the recording medium an ink composition containing a pigment as a colorant and an ink composition containing a dye as a colorant to record an image; and
ink jet recording means for controlling the means for depositing the ink compositions to record an image.

25. A record printed by the recording apparatus according to claim 24.

* * * * *